United States Patent [19]

Fuller

[11] 4,323,382

[45] Apr. 6, 1982

[54] METHOD OF PRESSING GLASS ARTICLES, ESPECIALLY FEET OF GLASSES WITH INTEGRALLY FORMED STEMS

[75] Inventor: Herman Fuller, Riedlhutte, Austria

[73] Assignee: Dorma Glas GmbH & Co. KG, Salzburg, Austria

[21] Appl. No.: 134,663

[22] Filed: Mar. 27, 1980

[51] Int. Cl.³ .............................................. C03B 11/08
[52] U.S. Cl. ....................................... 65/70; 65/120; 65/177; 65/305; 65/DIG. 10
[58] Field of Search ................... 65/56, 70, 305, 315, 65/177, DIG. 10, 120

[56] References Cited

U.S. PATENT DOCUMENTS

| 2,598,524 | 5/1952 | Fouse | 65/56 X |
| 3,409,342 | 11/1968 | Anderson et al. | 65/120 UX |
| 3,814,593 | 6/1974 | Parris | 65/305 |

*Primary Examiner*—Arthur D. Kellogg
*Attorney, Agent, or Firm*—Fitch, Even, Tabin, Flannery & Welsh

[57] ABSTRACT

Disclosed is a method of pressing glass articles, especially feet of glasses with integrally formed stems, by pressing a portion of a glass lump or parison into a mold having the (internal) contour of the glass article to be formed, with the other portion of the parison being left behind outside of the mold, and wherein the glass article is subsequently separated from the remaining part of the parison which comprises cutting off the still plastified connecting strand or core between the remaining part of the parison and the glass article, following the pressing operation, directly at the glass article, and removing the strand lug or protrusion left on the glass article, after removal of said glass article from the mold.

9 Claims, 1 Drawing Figure

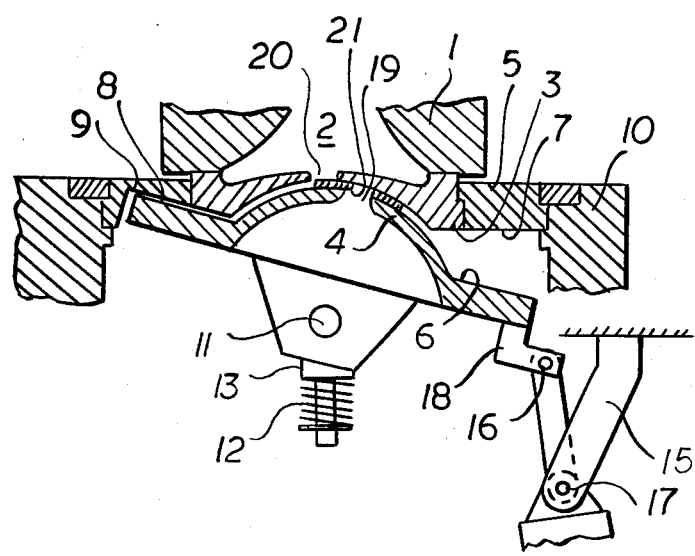

METHOD OF PRESSING GLASS ARTICLES, ESPECIALLY FEET OF GLASSES WITH INTEGRALLY FORMED STEMS

The present invention relates to a method of pressing glass articles, especially feet of glasses with integrally formed stems, by pressing a portion of a glass lump or parison into a mold having the (internal) contour of the glass article to be formed, with the other portion of the parison being left behind outside of the mold, and wherein the glass article is subsequently separated from the remaining part of the parison, further, the invention relates to an apparatus for carrying out such method and comprising a mold having a mold bottom defining and shaping an outer surface of the glass article and being provided with an aperture for pressing the glass into said mold.

As it is well known, in a method and apparatus of this kind problems are encountered in separating the formed glass article from the residual volume of the lump or parison used for the pressing operation, which is left in the press. Heretofore, the glass article was removed, whereby the joining core portion was expanded until it was broken. Then, the remains of the joining core portion (strand) had to be cut off in cold addition, this being a time-consuming work; alternatively, the workpiece had to be reheated to melt the protrusion off. The actually apparent cutting off has proved to be not practicable because with the conventional cutting devices the protrusions remained too large, if the cutting operation were still possible at all owing to the high plasticity of the glass in the pressing step.

It is further known that the glass parison used for the pressing step is metered with high precision and subsequently subjected to pressing, whereby any tolerances in metering affect the thickness of the foot, but not the overall hight of the foot with its stem. It is disadvantageous, however, that these pressing methods are practicable only with extreme apparatus expenditure and with the use of a plurality of parts subject to wear, such that these methods are only employed for the production of glassware of particularly high quality.

In view of this, it is the object of the present invention to provide a particularly simple method and an apparatus that can be manufactured and operated economically, which allow the pressing (press shaping) of a glass foot with an integral stem to be carried out while avoiding the above-discussed drawbacks. In particular, the starting point of the glass strand (core) formed in the pressing step should be neither visible nor sensible; the method should be suitable for mass production, and the apparatus for carrying out the method should be highly insusceptible to trouble and suitable for fully automatic production.

In a manner being surprising to the expert, it has been found that a solution to the existing problems may be realized by simple technical means, namely by cutting off the strand immediately after the pressing operation and directly at the glass article, wherein there are used as the cutting tool, a pair of spherical shells or cups adapted to be aligned with each other and adapted to be pivoted relative to each other, with the shell or cup which is movable relative to the strand being provided with an armor plating (reinforcement) on the opening thereof.

In detail, the method according to the invention is carried out by cutting off the still plastified connection strand or core between the remaining part of the parison and the glass article, following the pressing operation, directly at the glass article, and removing the strand lug or protrusion left on the glass article, after removal of said glass article from the mold.

Advantageously, removal of the strand protrusion may be effected in such a manner that said fusion is performed by applying a burner flame of relatively large area to the region of said protrusion or lug.

As far as the apparatus is concerned, the solution of the present object is characterized in that the outer side of said mold bottom, as seen from the glass article, is spherically recessed, and that said recess has mounted therein a cutting portion with a complementarily spherical surface, said cutting portion being likewise provided with an aperture adapted to be aligned with the aperture of said mold bottom to allow for the passage of the glass therethrough, and wherein said cutting portion is adapted to perform an angular movement which permits a point on the circumference to be displaced by a distance exceeding the diameter or width of said aperture of said mold bottom.

Advantageously, in order to obtain an extremely small strand protrusion after the cutting operation, the mold bottom is very thin in the region of the pressing aperture, and in order to provide for an economically reasonable service life of the cutting portions, the mold bottom may be formed of a nickel-beryllium alloy, while the cutting portion is formed of cast iron, wherein the cutting portion includes at the periphery of said pressing aperture and armor plating or reinforcement formed as a cutting edge and, at the side of said mold bottom an adjoining armor plating formed as a surface coating, each of a chromium-nickel alloy.

It is further advantageous that the cutting portion is pressed against the mold bottom by spring bias, and movement of the cutting portion is limited by the contact of predetermined surfaces with the mold bottom or the retainer ring thereof, respectively.

Below, an embodiment of the present invention is described in greater detail by referring to a drawing. The drawing shows a schematical sectional view of the pressing section and the cutting section, respectively, for the glass to be pressed into the mold and the glass strand to be cut.

As shown in the FIGURE, the apparatus according to the invention comprises essentially a mold 1 into the cavity of which glass is pressed for forming a glass article 2. In such pressing operation, apertures 19 and 20 of the mold bottom 3 and of the cutting portion 4 are aligned with each other, while these apertures are shown in the FIGURE in their positions following the cutting of the glass strand or core.

According to the drawing, the lower end of mold 1 is closed by a mold bottom 3 which is supported in a retainer or support ring 5 in combination with a base portion 10. Adjacent to its passage for the glass 20, the mold bottom 3 is formed extremely thin, e.g. with a thickness of one millimeter or a fraction thereof, and the mold bottom is spherically recessed in its side opposite the glass article.

Movably mounted within the spherical recess of the mold bottom 3 is a cutting portion 4 having an aperture or passage 19 for the glass to be pressed into the mold, said passage being provided with a reinforcement or armor plating 21 on its periphery. This reinforcement is also applied to the surface of the cutting portion 4 directed towards the mold bottom 3, around the aperture 19.

Cutting portion 4 is pivotable about a pivot 11 operating to urge the cutting portion 4 against the mold bottom 3 through a bolt 13 and belleville or dished springs 12. The radii of the spherical recess of the mold bottom 3 and of the surface of the cutting portion 4 directed towards the glass article are of identical lengths; accordingly, the center of the pivoting movement provided by this arrangement coincides with the center of pivot 11.

Laterally mounted to the cutting portion 4 is a pushrod 18 adapted to be moved in its position via a joint 16 by a pressurized fluid cylinder-piston assembly 14, the latter being adapted to oscillate on a fulcrum 17. Fulcrum 17 is retained by an anchor or tie rod 15 in such a way that extension of the piston of said cylinder-piston assembly 14 effects rotation of the cutting portion 4 into a position in which apertures 19 and 20 are aligned with each other and glass may be pressed from the not illustrated glass press into the cavity of mold 1. Following the pressing operation, the piston of the cylinder-piston assembly is retracted so as to move the cutting portion 4 through pushrod 18 and joint 16 into the position shown in the drawing, whereby the glass strand is cut off between the remains of the parison or glass lump left behind in the press and the then formed glass article, directly on the surface of the latter.

For limiting rotary movement during the cutting operation, abutment or stop faces 8 and 9 of the cutting portion 4 and of the retainer ring 5 or of the mold bottom 3, respectively, are provided, whereas the movement for providing the passages for the pressing of the glass is limited by abutment or stop faces 6 and 7, with face 7 being formed on the retainer ring and face 6 being formed on the cutting portion 4.

Essential to the invention is the selection of the materials for the mold bottom and the cutting portion as well as its armor plating or reinforcement. Preferably, the mold bottom 3 is formed of a nickel-beryllium alloy, while the cutting portion consists of cast iron onto which the reinforcement 21 of a chromium-nickel alloy is applied. Surprisingly, it has been found that the choice of these materials provides economical service life not only of the reinforced cutting edges as such, but also of the mold bottom, in spite of the great thermal and mechanical loads.

In another embodiment of the invention, the mold 1 may be fed also from the other side, in which case the glass strand or core is cut away from the residual mass remaining in the press at the upper end of the stem.

Still further, it is essential to the invention that the lug or protrusion of the cut off glass strand is subsequently fused to merge into the surrounding portions of the article; to this end, a gas supplied burner is used which has nozzles for the outflowing fuel gas arranged on its periphery in circular pattern. The diameter of the nozzle ring is greater than the diameter of the protrusion, such that the protrusion may be positively fused or melted off without leaving any visible or sensible steps (irregularities). Under the action of the thermal energy, the strand protrusion is surprisingly smoothed out to merge into the surrounding surface. During the melting step which is performed immediately after the removal the pressed glass article from the mold is smoothed such that the article need not be reheated, the glass article or stemmed foot, respectively, is kept in rotation. The burner is positioned on the projetion of the axis of rotation. As rotary devices of this type are commonly known in glass manufacturing industry, they need not be described in any greater detail.

In view of the fact that it has heretofore not been possible to effect in a cutting operation a subsequent fusion or melting of the remaining protrusion or lug which is thereafter neither visible nor sensible, it may be spoken of an ideal solution to the existing problems. This applies the more as the apparatus is designed for long term operation free from trouble and without maintenance.

What we claim is:

1. A method of pressing glass articles from a glass parison to form feet of glasses with integrally formed stems; said method comprising:
   pressing substantially all of the glass parison into a mold having the internal contour of the glass article to be formed with a portion of the parison being left behind outside of the mold, the glass article is subsequently separated from the remaining part of the parison; cutting off the still plastified connecting protrusion between the remaining part of the parison and the glass article following the pressing operation; and, removing the protrusion left on the glass article and in the mold bottom by forming the same into the foot.

2. The method according to claim 1, in which the step of removing the protrusion comprises fusing the protrusion into the surrounding glass by means of thermal energy.

3. The method according to claim 2 in which the fusion is performed by applying a burner flame of relatively large area to the region of said protrusion.

4. In an apparatus for pressing a foot of a glass with an integral stem from a parison of glass, said method comprising:
   a mold having a mold bottom defining and shaping an outer surface of the foot and being provided with an aperture of a predetermined size for pressing the glass into said mold; an outer side of said mold bottom being spherically recessed; a cutting portion with a complementarily spherical surface, said cutting portion having an aperture of similar diameter adapted to be aligned with the aperture of said mold bottom to allow for the passage of the glass therethrough, means for moving said cutting portion to perform an angular movement which permits a point on the circumference to be displaced by a distance exceeding the diameter or width of said aperture of said mold bottom to sever that portion of the glass outside of the mold from a protrusion of glass remaining in the aperture in said mold bottom.

5. The apparatus according to claim 4 in which the spherical surface of said mold bottom and the outer surface of said cutting portion are curved with identical radii of curvature.

6. The apparatus according to claim 4 in which said mold bottom is extremely thin in the region of said pressing aperture.

7. The apparatus according to claim 4 in which the mold bottom is formed of a nickel-beryllium alloy.

8. The apparatus according to claim 4 in which said cutting portion includes at the periphery of said pressing aperture an armor plating or reinforcement formed as a cutting edge; and, said mold bottom having an adjoining armor plating formed as a cutting edge, each of the edges being a chromium-nickel alloy.

9. The apparatus according to claim 4 in which the cutting portion is pressed against said mold bottom under spring bias, abutment faces on said mold bottom engaging and stopping the turning movement of the cutting portion.

* * * * *